United States Patent
Begley

(10) Patent No.: US 7,326,275 B2
(45) Date of Patent: Feb. 5, 2008

(54) METHOD AND APPARATUS FOR INFERRING HYDROCARBON LEVEL IN A SCRUBBER

(75) Inventor: Chris C. Begley, Ortonville, MI (US)

(73) Assignee: Delphi Technologies, Inc., Troy, MI (US)

( * ) Notice: Subject to any disclaimer, the term of this patent is extended or adjusted under 35 U.S.C. 154(b) by 328 days.

(21) Appl. No.: 11/110,536

(22) Filed: Apr. 20, 2005

(65) Prior Publication Data
US 2006/0236864 A1    Oct. 26, 2006

(51) Int. Cl.
*B01D 53/02* (2006.01)
*F02M 25/08* (2006.01)

(52) U.S. Cl. .............. 95/14; 95/146; 96/112
(58) Field of Classification Search ............ 96/112, 96/147; 95/14, 146; 123/518, 519, 520, 123/521
See application file for complete search history.

(56) References Cited

U.S. PATENT DOCUMENTS

| | | | | |
|---|---|---|---|---|
| 5,054,453 A | * | 10/1991 | Onufer ................ | 123/516 |
| 6,537,355 B2 | * | 3/2003 | Scardino et al. ........ | 96/147 |
| 6,540,815 B1 | * | 4/2003 | Hiltzik et al. ............ | 95/146 |
| 6,607,583 B2 | * | 8/2003 | Cowles et al. .......... | 95/107 |
| 6,769,415 B2 | * | 8/2004 | Reddy et al. ............ | 123/519 |
| 6,817,346 B2 | * | 11/2004 | Konishi et al. .......... | 123/519 |
| 2002/0148354 A1 | * | 10/2002 | Amano et al. ............ | 96/112 |

FOREIGN PATENT DOCUMENTS

| JP | 06-093932 A | * | 4/1994 |
|---|---|---|---|
| JP | 2003-314384 A | * | 11/2003 |

* cited by examiner

*Primary Examiner*—Frank M. Lawrence
(74) *Attorney, Agent, or Firm*—Paul L. Marshall

(57) ABSTRACT

A flow-through carbon adsorption device is provided with leads for imposing an electric current and with a temperature sensor at the desorption flow exit. The temperature sensor and electric current source are controlled by a controller. In adsorption mode, no current flows through the device. Hydrocarbons are adsorbed in the device before reaching atmosphere. In desorption mode, the temperature sensor and electric source are activated by the controller. Electric energy is converted to heat energy within the device. Air is drawn in reverse flow through the device. Because desorption is endothermic, the carbon bed becomes progressively cooler during desorption. When desorption is complete, the temperature of the device begins to rise and the controller shuts down the temperature probe and the electric heating system. Thus, full desorption of the device is assured without significant waste of electricity or compromise of subsequent adsorptive capacity of the device after desorption is complete.

9 Claims, 2 Drawing Sheets

METHOD AND APPARATUS FOR INFERRING HYDROCARBON LEVEL IN A SCRUBBER

TECHNICAL FIELD

The present invention relates to internal combustion engines; more particularly, to devices for preventing escape of hydrocarbons into the atmosphere through adsorption onto adsorptive media; and most particularly, to a method and apparatus for inferring the level of hydrocarbon loading of an activated carbon scrubber device.

BACKGROUND OF THE INVENTION

Hydrocarbon adsorber systems for preventing escape of hydrocarbon vapors into the atmosphere are well known. Vehicles are routinely provided with canisters containing activated carbon for trapping fuel tank vapors displaced when a fuel tank is refilled. To meet very low emissions standards, the outlet of a canister may be further provided with a high-efficiency adsorptive carbon monolith scrubber for scavenging traces of vapor which may pass through the main canister. After the fuel tank is filled and the engine restarted, a connection of the adsorber system to vacuum in the engine's intake manifold causes atmospheric air to be drawn through the scrubber and canister, gradually desorbing the adsorbed hydrocarbons and presenting them to the intake manifold for engine combustion.

A post-canister scrubber is typically a high-efficiency device having low capacity. Therefore, it is very important that the scrubber be completely purged of adsorbed hydrocarbons during each desorption cycle. In the prior art, there is not a means for determining the hydrocarbon level in an activated carbon device, nor for determining when desorption is complete. One approach would be to install a hydrocarbon sensor adjacent to the scrubber to measure the hydrocarbon content of purge air passing out of the scrubber and into the canister. This approach would add significantly to the cost of a vehicle.

For some vehicles, as for example Hybrid vehicles, in order to meet PZEV standards for vehicle emissions, heating of a carbon scrubber and canister to allow efficient purging thereof is required. A carbon scrubber acts as a resistor when voltage is applied across it, causing the scrubber to heat up and thereby accelerating the purging of adsorbed hydrocarbons.

A disadvantage of electric heating of an adsorptive device is that it is wasteful of electricity, which makes it a significant power parasitic.

An additional disadvantage is that if the electric current is maintained after desorption of the scrubber and canister is complete, the temperature of the carbon in both adsorbers will continue to rise, thereby progressively reducing the desorption capacity of the hydrocarbon adsorption system while wasting additional electricity. Therefore, for both these reasons, it is desirable to shorten the period of desorptive heating to the minimum time required for completion.

What is needed in the art is method and apparatus for determining simply and reliably when desorption of an adsorber is complete, in order to be able to shut down the scrubber's heater at the minimum required heating period.

It is a principal object of the present invention to minimize the total electricity required for a desorption cycle of an electrically heated hydrocarbon canister and scrubber system.

It is a further object of the invention to shut down the heater at the earliest possible time, thereby presenting the coolest possible canister and scrubber for the next cycle of adsorption.

SUMMARY OF THE INVENTION

Briefly described, a flow-through carbon adsorption device connected to a source of gaseous hydrocarbons is provided with electric leads at opposite ends thereof and with a temperature sensor at the hydrocarbon-entrance end. The electric leads are connected across a source of current, for example, a switch-controlled 12-volt DC electric current such as is presently provided for many automotive vehicles. The temperature sensor and the electric system are controlled by a controller. In adsorption mode, the switch is open and no current flows through the device. Hydrocarbons enter the adsorption device at the hydrocarbon-entrance end and are adsorbed into the carbon bed before reaching the atmosphere outlet end. In desorption mode, air flow is reversed and the temperature sensor, the electric system, and a purge valve are activated by the controller. The carbon scrubber is a resistor and electric energy is converted to heat energy within the carbon bed, thus increasing the rate of desorption. Atmospheric air is drawn in reverse flow from the atmosphere outlet end through the hydrocarbon-entrance end, where the temperature of the exiting air is sensed and sent to the controller. The desorbing air passing over the carbon to scavenge hydrocarbons therefrom is at or near the temperature of the carbon bed. Because desorption is endothermic, the carbon bed becomes progressively cooler during desorption. The instantaneous temperature at the device outlet is sensed and sent to the controller which is programmed to follow predetermined time-temperature behavior of the scrubber. When desorption is complete, the device begins to be heated without compensatory desorptive cooling, and the outlet air temperature begins to rise. At this point in time, the controller switches the system back to adsorptive mode and shuts down the temperature probe and the electric heating system. Thus, full desorption of the device is assured without significant waste of electricity or compromise of subsequent adsorptive capacity of the device after desorption is complete.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
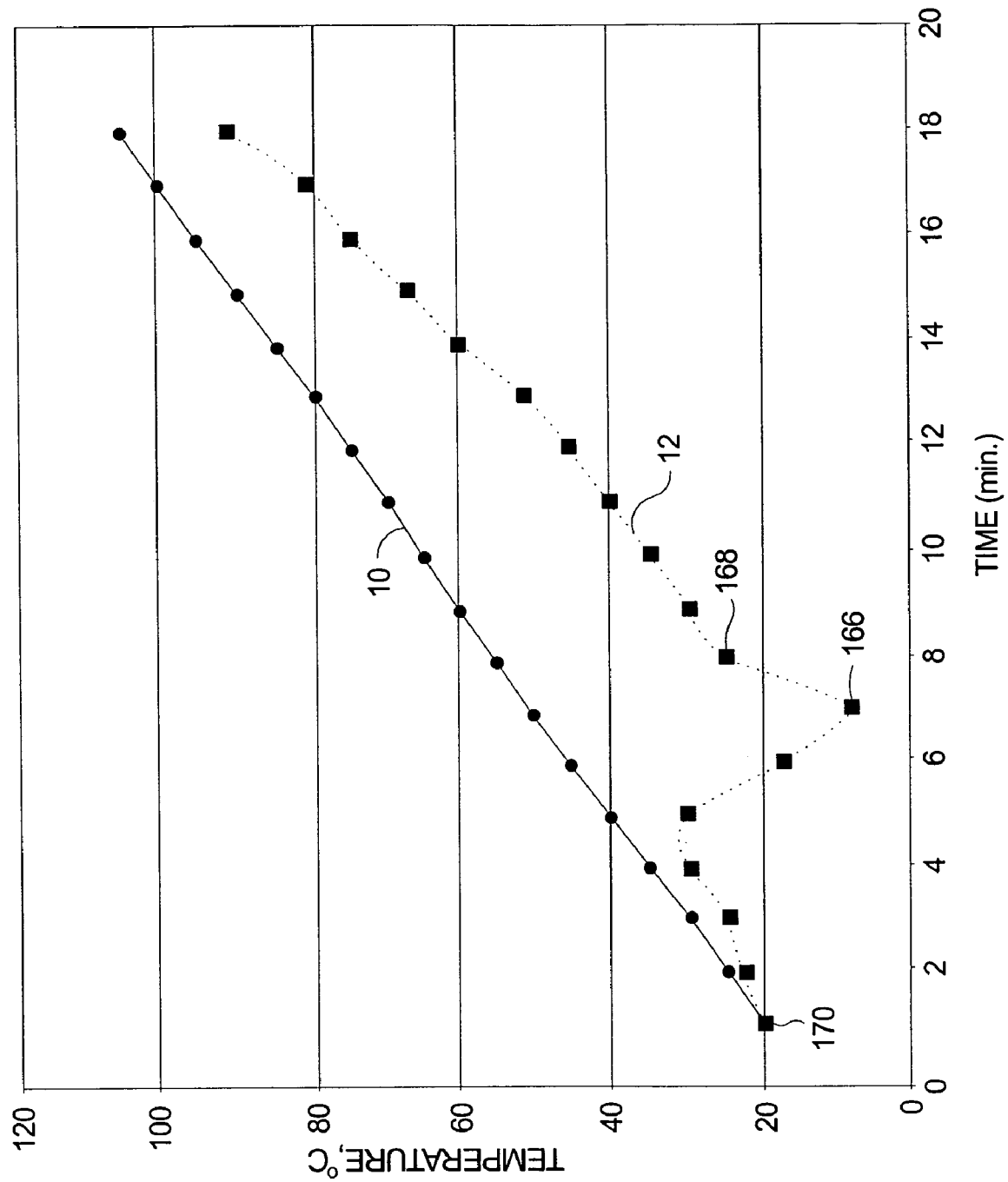
FIG. 1 shows graphs of temperature as a function of time for a carbon scrubber device equipped in accordance with the invention, one graph being of a clean scrubber, and the other graph being of a scrubber having adsorbed hydrocarbons and undergoing hydrocarbon desorption.

Referring to FIG. 1, two theoretical superimposed graphic curves are illustrative of the principles upon which the present invention is based. When an activated carbon adsorber as is known in the prior art is equipped with means for passing electric current through it, the temperature of the adsorber increases with time, because the adsorber acts as a resistance element in the electric circuit. Thus, the exit temperature of air passing through the adsorber also increases with time, as shown in Curve 10.

When the adsorber is carrying a load of hydrocarbons adsorbed into its carbon bed, which can be stripped from the carbon by passing air through the adsorber, the exit air temperature (Curve 12) is seen to increase for a brief period and then to decrease abruptly. It is believed that this is because the adsorber heats quite rapidly and the surface of the adsorber is quickly stripped of hydrocarbon; during this period, electric heating is greater than endothermy of stripping. At some point, however, shown in this example as being at about 4-5 minutes, migration of hydrocarbon to the surface of the adsorber causes endothermy of stripping to exceed electric heating (which is preferably a constant), and thus the temperature falls precipitously to a minimum at about 7 minutes. After this time, the slope of the curve again becomes positive, and after 8 minutes the slope is approximately the same as the slope of Curve 10, i.e., the adsorber is fully stripped. Thus, in this example, continuing to electrify the adsorber beyond about 7-8 minutes is unnecessary and wasteful of electricity.

Figure 2:
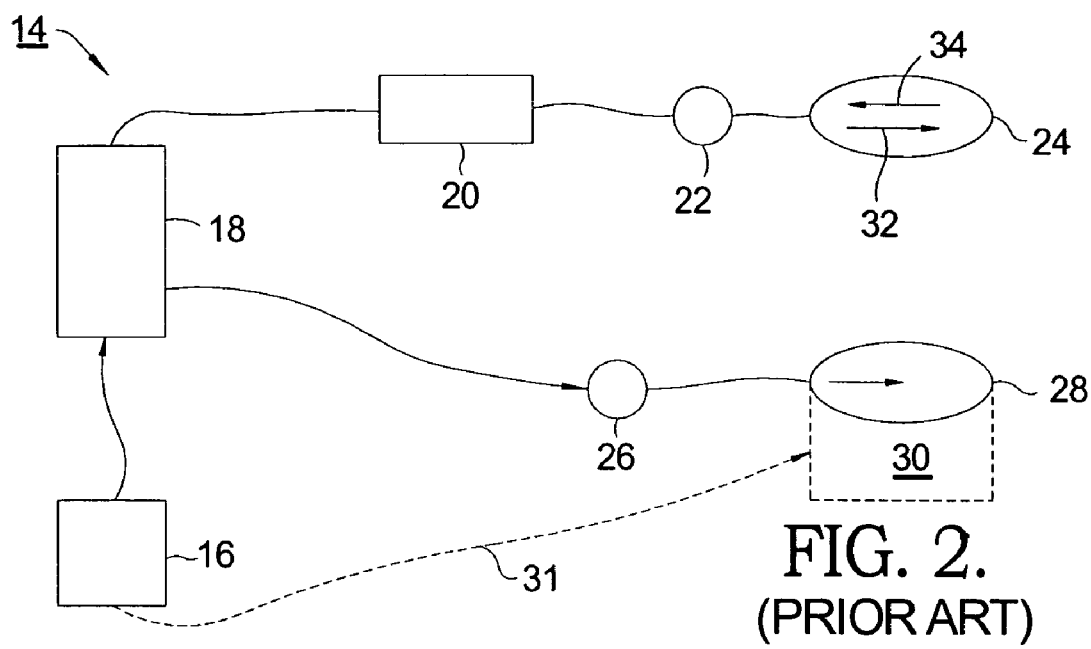
FIG. 2 is a schematic diagram of a prior art fuel tank vapor adsorption system.

Referring now to FIG. 2, a simplified prior art emissions control and recovery system 14 for a fuel tank comprises a fuel tank 16, a primary adsorption canister 18 filled typically with activated carbon and connected to the fuel tank, a secondary carbon scrubber 20 such as a formed carbon monolithic structure connected to the primary canister, a canister vent solenoid 22 connected to the scrubber and leading to atmosphere 24, and a canister purge valve 26 connected to the canister and leading to the intake manifold 28 of an internal combustion engine 30 which draws fuel from fuel tank 16 via fuel line 31.

In operation, in preparation for refilling fuel tank 16, solenoid 22 is opened and valve 26 is closed (typically, solenoid 22 is always open, and is provided for use in system diagnostics). As fuel tank 16 is refilled with fuel (not shown), vapor-laden air in fuel tank 16 is displaced to atmosphere 24 in a first direction 32 (rather than into manifold 28), the hydrocarbon vapors being adsorbed in canister 18 and scrubber 20. When engine 30 is subsequently restarted, creating a vacuum in intake manifold 28, canister purge valve 26 is opened, allowing air from atmosphere 24 to be drawn by the manifold vacuum in a second and reverse direction 34 through scrubber 20 and canister 18, thereby stripping adsorbed hydrocarbons from the scrubber and canister and passing such hydrocarbons into intake manifold 28 for combustion in engine 30. The temporary vacuum imbalance created in engine 30 during the desorption operation is acceptable; however, valve 26 may be closed at the termination of stripping.

Because the functionality of scrubber 20 is so important to meeting low-emission regulations, it is important to have positive assurance that the scrubber is fully discharged of hydrocarbons during the desorption cycle; hence the need for the present invention. Of course, the main adsorption means, canister 18, also should be substantially stripped before the fuel tank is again refilled, but during engine operation the adsorption system is subjected to passage in reverse direction 34 of a volume of fresh atmospheric air into fuel tank 16 equal to the volume of fuel consumed by engine 30. Thus, the complete desorption of canister 18 during the initial minutes of engine operation is less critical than is the complete desorption of scrubber 20. However, it is obvious that canister 18 may be also equipped in accordance with the invention if so desired, and such a configuration is fully comprehended by the invention.

Figure 3:
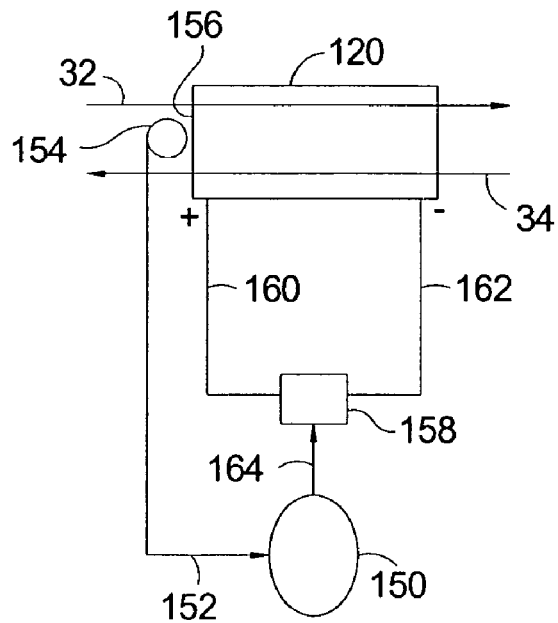
FIG. 3 is a detailed view of a hydrocarbon scrubber in accordance with the invention.

Referring to FIG. 3, an improved scrubber 120 in accordance with the invention may be mounted in a prior art system such as is shown in FIG. 2 in place of prior art scrubber 20. Like scrubber 20, improved scrubber 120 comprises a hydrocarbon-adsorptive bed, preferably a carbon monolith structure, which can accommodate air and vapor flow in both a first (adsorption) direction 32 and a second (desorption) direction 34. A programmable controller 150, for example a programmed computer or engine control module as is well known in the prior art, receives a signal 152 from a temperature sensor 154 disposed at the desorption exit end 156 of scrubber 120 for sensing the exit temperature of desorption air passing through scrubber 120 in direction 34. A switchable source 158 of electric power, for example a 12-volt DC system, is connected by leads 160,162 to opposite ends of scrubber 120 such that when source 158 is switched on by command 164 from controller 150, scrubber 120 is coupled into an electric circuit wherein the scrubber becomes a heat-generating resistance element.

In operation, during refueling of tank 16, scrubber 120 behaves like prior art scrubber 20, with air/vapors flowing in adsorption direction 32, and power source 158 is inactive. During desorption or stripping mode, air/vapors flow in reverse direction 34. Controller 150 switches on source 158 and monitors temperature signals 152 from sensor 154, applying such signals via a program (such as, for example, from a stored look-up table or by an algorithm) stored in controller 150. When a predetermined time and temperature are reached, for example, the minimum temperature 166 shown in FIG. 1, or a successive time and temperature combination, for example, point 168 shown in FIG. 1 as the beginning of a straight line heating portion of Curve 12, controller 150 shuts off electric source 158. It should be observed that the temperature at point 168 is only slightly higher than the starting adsorption temperature (point 170); thus scrubber 120 has been fully desorbed without significant overheating, and without significant waste of electricity, and is ready for another adsorption cycle.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An apparatus for adsorbing hydrocarbons and for being desorbed of hydrocarbons by the passage of air therethrough, comprising:
    a) a hydrocarbon-adsorptive bed having entrance and exit ports, respectively, of desorptive air passed through said apparatus;
    b) a switchable electric power source connected to said hydrocarbon-adsorptive bed;
    c) a temperature sensor for sensing the temperature of desorptive air at said exit port; and
    d) a controller in electrical communication with said power source to energize and de-energize said electric power source in response to signals from said temperature sensor, wherein said controller is configured to de-energize said electrical power source after receiving signals from said temperature sensor indicating that the temperature of desorptive air has reached a minimum temperature.

2. An apparatus in accordance with claim 1 wherein said hydrocarbon-adsorptive bed is a carbon monolith structure.

3. An apparatus in accordance with claim 1 wherein said electric power source is a 12-volt DC electric system.

4. An apparatus in accordance with claim 1 wherein said controller is selected from the group consisting of programmable controller and computer.

5. A vehicle comprising;
   a) a fuel tank; and
   b) apparatus for adsorbing hydrocarbon vapors displaced from said fuel tank during refueling thereof and for being desorbed of hydrocarbons by the passage of air therethrough, wherein said apparatus includes,
   a hydrocarbon-adsorptive bed having entrance and exit ports, respectively, of desorptive air passed through said apparatus,
   a switchable electric power source connected to said hydrocarbon-adsorptive bed,
   a temperature sensor for sensing the temperature of desorptive air at said exit port, and
   a controller in electrical communication with said power source to energize and de-energize said electric power source in response to signals from said temperature sensor, wherein said controller is configured to de-energize said electrical power source after receiving signals from said temperature sensor indicating that the temperature of desorptive air has reached a minimum temperature.

6. A method for desorbing hydrocarbon vapors from a hydrocarbon-adsorptive device, the device having entrance and exit ports for passage of desorptive air through said device, a switchable electric power source connected to said hydrocarbon-adsorptive device, a temperature sensor for sensing the temperature of desorptive air at the exit port, and a controller, the method comprising the steps of:
   a) energizing said electric power source by said controller;
   b) passing desorptive air through said device;
   c) receiving periodic signals in said controller from said temperature sensor;
   d) determining from said signals when a minimum temperature has been reached; and
   e) de-energizing said electric power source at a predetermined time interval after said minimum temperature has been reached, which time interval may be zero.

7. A method for desorbing hydrocarbon vapors from a hydrocarbon-adsorptive device, the device having entrance and exit ports for passage of desorptive air through said device, a switchable electric power source connected to said hydrocarbon-adsorptive device, a temperature sensor for sensing the temperature of desorptive air at the exit port, and a controller, the method comprising the steps of:
   a) energizing said electric power source by said controller;
   b) passing desorptive air through said device;
   c) receiving periodic signals in said controller from said temperature sensor;
   d) determining when a minimum temperature has been reached by receiving said signals from said temperature sensor indicating a decrease in the temperature of desorptive air at the exit port followed by receiving said signals from said temperature sensor indicating an increase in the temperature of desorptive air at the exit port; and
   e) de-energizing said electric power source at a predetermined time interval after said minimum temperature has been reached.

8. An apparatus in accordance with claim 1 wherein said controller is configured to de-energize said electrical power source after receiving signals from said temperature sensor indicating a decrease in temperature of desorptive air followed by an increase in temperature of desorptive air.

9. A vehicle in accordance with claim 5 wherein said controller is configured to de-energize said electrical power source after receiving signals from said temperature sensor indicating a decrease in temperature of desorptive air followed by an increase in temperature of desorptive air.

* * * * *